United States Patent [19]
Teegarden et al.

[11] Patent Number: 5,895,724
[45] Date of Patent: Apr. 20, 1999

[54] RECOVERABLE BACKINGS FOR CELLULOSE ACETATE FILM SUPPORT

[75] Inventors: David M. Teegarden, Rochester; Raymond T. Jones, Webster; Hans R. Grashof, Rochester, all of N.Y.

[73] Assignee: Eastman Kodak Company, Rochester, N.Y.

[21] Appl. No.: 08/788,475

[22] Filed: Jan. 28, 1997

[51] Int. Cl.[6] .......................... B32B 27/00; B32B 27/06; G03C 1/85
[52] U.S. Cl. .......................... 428/500; 428/507; 428/508; 430/527; 430/530
[58] Field of Search ...................... 428/500, 507, 428/508; 430/527, 530, 533

[56] References Cited

U.S. PATENT DOCUMENTS

| | | | |
|---|---|---|---|
| 1,844,711 | 2/1932 | Allen . | |
| 3,956,088 | 5/1976 | Fassell et al. | 204/109 |
| 4,283,479 | 8/1981 | Hamaoka et al. | 430/264 |
| 4,948,720 | 8/1990 | Chen et al. | 430/527 |
| 5,006,451 | 4/1991 | Anderson et al. | 430/527 |
| 5,472,833 | 12/1995 | Havens et al. | 430/510 |
| 5,500,328 | 3/1996 | Surash et al. | 430/347 |
| 5,702,809 | 12/1997 | Tixier et al. | 428/216 |
| 5,709,983 | 1/1998 | Brick et al. | 430/519 |
| 5,723,270 | 3/1998 | Smith et al. | 430/517 |

OTHER PUBLICATIONS

Research Disclosure No. 12629, Oct. 1974, A. Peeples.
Research Disclosure No. 19634, Aug. 1980, J. D. Abbott et al.

*Primary Examiner*—Mukund J. Shah
*Assistant Examiner*—Deepak R. Rao
*Attorney, Agent, or Firm*—Carl F. Ruoff

[57] ABSTRACT

The present invention is recyclable photographic film base which includes a cellulose acetate support. An antistatic layer is superposed on one side of the support and includes an antistatic agent. A barrier layer comprising a polymeric composition having a glass transition temperature of less than 90° C. overlies the antistatic layer. In a preferred embodiment the polymeric composition of the barrier layer in poly(isobutyl methacrylate).

11 Claims, No Drawings

RECOVERABLE BACKINGS FOR CELLULOSE ACETATE FILM SUPPORT

FIELD OF THE INVENTION

The present invention relates to a backing system for photographic elements. More particularly, the present invention provides a backing layer which withstands film processing, yet is removable if the support needs to be recycled.

BACKGROUND OF THE INVENTION

Photographic film comprises a light sensitive coating on a polymeric support. Since about 1930 one support material has been cellulose triacetate (sometimes referred to as cellulose acetate). During the manufacture of cellulose acetate-based photographic film, a certain amount of waste is generated, either during the casting of the support and application of gelatin subbing and backside layers, or during application of the sensitizing layers. In addition, once the film has been used it is possible to recover the support material for reuse of the polymer by separating the light sensitive coating from the polymer support and then treating the support. Given the cost of virgin cellulose acetate, it is economically beneficial to recycle any cellulose acetate support that fails to meet specifications for one reason or another. Numerous ways have been devised for recovery of cellulose acetate supports.

Research Disclosure Item 12629, published October 1974, Research Disclosure Item 19634, published August 1980, U.S. Pat. Nos. 1,844,711, 3,956,088 and 5,500,328 describe some techniques for treating film supports to recover cellulose acetate.

The recycling or recovery operation involves the chemical stripping and removal of all layers from the cellulose acetate-base to make it fit for reuse. Support that has been so treated is called recycled acetate support.

Cellulosic film support used for consumer films can build up static charge when transported through coating machines during manufacture or through cameras during use. This static charge can discharge and fog the light sensitive emulsion layers, hence, the need for static protection. Since photographic films are used under a variety of humidity conditions, it would be advantageous to use a humidity independent antistatic agent to maximize static protection. If some antistatic agents are not protected from photographic processing solutions, however, they can lose their conductivity and the film is prone to pick up dust which leads to white spots on prints. A protected antistatic agent, in turn, would maintain its conductivity after processing and reduce or eliminate white spots on prints.

Another problem associated with processing of photographic films is that of scum formation. Sources of the scum include residual processing solution or salt deposits from hard water. A backing layer that minimizes the formation of scum and reduces the need to clean the negatives before printing is highly desirable.

The incorporation of a lubricant in a backing layer improves the transport of the support or film through production equipment and cameras and is highly desirable.

Thus, there exists a need for a backing system for photographic elements which provides all of the above-mentioned features. The present invention describes a two or three layer backing for a photographic element which includes a cellulose acetate support, an antistatic layer which is process survivable, a barrier layer comprising a water-insoluble polymer and preferably an overcoat lubricant layer. The backing system of the present invention provides antistatic protection for cellulose acetate films and is removable thereby allowing recycling of the cellulose acetate support.

SUMMARY OF THE INVENTION

The present invention is recyclable photographic film base which includes a cellulose acetate support. An antistatic layer is superposed on one side of the support and includes an antistatic agent. A barrier layer comprising a polymeric composition having a glass transition temperature of less than 90° C. overlies the antistatic layer.

In a preferred embodiment the polymeric composition of the barrier layer in poly(isobutyl methacrylate).

DESCRIPTION OF THE PREFERRED EMBODIMENT

Photographic elements which can be provided with the backing system in accordance with this invention can differ widely in structure and composition. For example, they can vary greatly in regard to the number and composition of the image-forming layers, and the kinds of auxiliary layers that are included in the elements. In particular, the photographic elements can be still films, motion picture films, x-ray films, or graphic arts films. They can be black-and-white elements, color elements adapted for use in a negative-positive process, or color elements adapted for use in a reversal process.

Photographic elements of the present invention comprise cellulose acetate film support. The image-forming layer or layers of the element typically comprise a radiation-sensitive agent, e.g., silver halide, dispersed in a hydrophilic water-permeable colloid. Suitable hydrophilic vehicles include both naturally-occurring substances such as proteins, for example, gelatin, gelatin derivatives, cellulose derivatives, polysaccharides such as dextran, gum arabic, and the like, and synthetic polymeric substances such as water-soluble vinyl polymers like poly(vinylpyrrolidone), acrylamide polymers, and the like. A particularly common example of an image-forming layer is a gelatin-silver halide emulsion layer.

Suitable antistatic agents for the antistatic layer of the present invention include vanadium pentoxide; vinyl benzene quaternary ammonium polymers; an ester of cellulose having at least 8 acyl groups per $C_{24}$ cellulose unit wherein at least a majority of the acyl groups are derived from an aliphatic polycarboxylic acid having 3 to 6 carbon atoms, or a salt of the ester; or a copolymer of a vinyl benzene sulfonic acid and an ethylenically unsaturated monomer containing at least one primary hydroxyl group crosslinked with a methoxyalkylmelamine. These antistatic agents are described in U.S. Pat. Nos. 4,070,189; 4,203,769; 4,459,352 and 5,318,878. The antistatic layer is typically prepared by coating of a colloidal solution of the antistatic agent.

The essential component of the barrier layer employed in the support materials of this invention is a polymer, copolymer or polymer blend having sufficient hydrophobic functionality such that water and photoprocessing solutions are prevented from penetrating to the antistatic layer. Optional additional components of the barrier layer include a coalescing agent, a wetting agent, and a crosslinking agent. The coalescing agent is employed to aid in forming a high quality continuous film that is effective as a barrier. The purpose of including the wetting agent is to promote coatability.

The overcoat layer of the present invention provides lubricity and prevents scum formation to the photographic film element. This layer can include additional components such as a coalescing agent or matte particles and a crosslinking agent.;

The backing system of the present invention for use on cellulose acetate support includes an antistatic layer. The antistatic layer can be any layer used in film elements and more particularly vanandium pentoxide/cellulose nitrate antistatic layer as described in U.S. Pat. Nos. 4,203,796; 5,006,451; 5,356,468; and 5,366,544. The preferred coating composition of the antistatic layer is 0.05 weight percent vanadium pentoxide and 0.1 weight percent cellulose nitrate with the balance being the coating vehicle when the film support is cellulose acetate. The coating vehicle for the coating composition is primarily solvent. Suitable solvents include ketones, such as acetone, methylethyl ketone, diethyl ketone, dibutyl ketone and the like; alcohols, such as, methanol, ethanol, n-propanol, isopropanol, tert-butanol; water and the like. A particularly suitable solvent includes a mixture of acetone, an alcohol and water. The vanadium pentoxide/cellulose nitrate layer should be applied at a dry coverage of at least 0.3 mg/sqft, preferably from about 0.8 to about 4 mg/sqft.

A barrier layer is provided over the antistatic layer to prevent the loss of conductivity of the antistatic agent during photographic processing. A number of polymeric materials or blends of polymeric materials resist the passage of water and/or ionic species that would react or otherwise interfere with the conductivity of the antistatic agent. The barrier layer of the present invention is a polymeric composition having a glass transition temperature of less than 90° C. Suitable polymeric compositions include poly(butyl methacrylate), and copolymers of methyl methacrylate, butyl methacrylate and methacrylic acid. Surprisingly, poly(isobutylmethacrylate) has been found to meet these antistatic needs and to be removable from the cellulose acetate to allow recovery of the cellulose acetate. Preferred poly(isobutylmethacrylate) is available from ICI Acrylics as Elvacite® 2045.

Finally a topcoat which prevents formation of hard water scum and provides lubricity to the photographic film element is optionally included. This layer comprises a mixture of cellulose acetate, cellulose nitrate and fluorinated polymer particles having a size of less than about 0.4 microns. Any suitable ethylenically unsaturated fluorinated monomers can be used for the preparation of the fluorinated polymer particles, such as, for example, tetrafluoroethylene, hexafluoropropylene, perfluorovinyl ether including perfluoro(methyl vinyl ether) and perfluoro(propyl vinyl ether). The fluorinated polymer particles can also be made of copolymers of fluorinated monomers with other ethylenically unsaturated monomers such as vinylidene fluoride, vinyl fluoride, chlorotrifluoroethylene, ethylene, propylene, and the like.

Fluorinated polymer particles useful for the practice of the present invention include, for example, FEP 120 and Teflon PFA 335J, manufactured by E. I. du Pont de Nemours & Co. Teflon FEP 120 is an aqueous dispersion of tetrafluoroethylene-hexafluoropropylene copolymer and has a particle size from 0.1 to 0.26 μm. Teflon PFA 335J is an aqueous dispersion of tetrafluoroethylene-perfluorovinyl ether copolymers and has a particle size of from 0.1 to 0.25 μm.

The cellulose acetate used in this layer preferrably has an acetyl content of 32 percent acetyl or less. Higher acetyl contents are less effective at minimizing the formation of scum. The cellulose nitrate in the topcoat provides superior adhesion of this layer to the barrier layer when the ratio of the cellulose acetate to cellulose nitrate is between 1:1 and 1.5:1. The fluorinated or polytetrafluoro-ethylene polymer particles used as the lubricant in this layer can be varied from 5 to 40 weight percent of the cellulose esters. The coating vehicle for this layer is primarily solvent. Suitable solvents include ketones such as acetone, methylethyl ketone, diethyl ketone, dibutyl ketone and the like; alcohols, such as, methanol, ethanol, n-propanol, isopropanol, n-butanol, isobutanol, tert-butanol; water and the like. A particularly suitable solvent includes a mixture of acetone, an alcohol and water. Most preferably a mixture of acetone, methanol and water is used. This layer should be applied at a dry coverage of from 10 to 200 mg/sq ft, preferably at 25 mg/sq ft.

The sensitized side of the film support may be sensitized to a particular spectrum of radiation with, for example, a sensitizing dye, as is known in the art. Additional light-sensitive layers may be sensitized to other portions of the spectrum. The light-sensitive layers may contain or have associated therewith dye-forming compounds or couplers. For example, a red-sensitive emulsion would generally have a cyan coupler associated therewith, a green-sensitive emulsion would be associated with a magenta coupler, and blue-sensitive emulsion would be associated with a yellow coupler. Other layers and addenda such as antistatic compositions, subbing layers, surfactants, filter dyes, protective layers, barrier layers, development inhibiting releasing compounds, and the like can be present in photographic elements of the invention, as is well known in the art. Detailed descriptions of photographic elements and their various layers and addenda can be found in the *Research Disclosure* 36320 and in James, "The Theory of the Photographic Process", Fourth Edition, 1977.

The following examples further illustrate the present invention.

EXAMPLE 1

A solution of 0.05 percent silver-doped vanadium pentoxide and 0.1% cellulose nitrate in acetone/methanol was coated from a two-roll coating hopper (See U.S. Pat. No. 5,531,827) onto cellulose triacetate photographic film support, and dried, providing a total dry coverage 3 mg/ft$^2$. This was overcoated with a 2% solution of Elvacite® 2041 in acetone/methanol and dried, giving a dry coverage of the barrier of approximately 36 mg/ft$^2$. Finally, a solution of 0.5% cellulose acetate with 32% acetyl substitution, 0.5% cellulose nitrate and 0.1% Teflon FEP 120 was similarly coated. On drying, the dry coverage of this topcoat was approximately 20 mg/ft$^2$.

The film sample was chopped into small pieces and heated at 90° C. in a 3 wt % aqueous NaOH solution with efficient stirring for 30 min. The samples were removed, washed well with water, and then heated to 90° C. in a solution of 1.7 wt % KMnO$_4$ in 5.3 wt % aqueous H$_2$SO$_4$ with efficient stirring for 45 min. Excess KMnO$_4$ was reacted with NaHSO$_3$, and the sample was separated, washed, and dried.

Samples of support chopped into small pieces as above were extracted with efficient stirring three times with a solution of toluene/tetrahydrofuran (95/5 by volume). Combined extracts were reduced in volume, filtered to remove insolubles, and analyzed by HPLC. The amount of barrier material in parts per million relative to the cellulose triacetate was determined from calibration curves. Results are given in Table 1 as "percent removed", a comparison of the barrier material remaining following the recovery operation vs the amount present in the same as coated. Table 1 shows the total number of backing layers coated, the midpoint of the glass transition temperature ($T_g$), the approximate weight percent of acid functionality, and the approximate barrier layer dry coverage in mg/ft$^2$.

EXAMPLES 2–11

Three-layer coatings with different barrier materials at varying dry coverages were obtained and subjected to the recovery steps as in Example 1. The results are summarized in Table 1. MMA-BMA-MA designates a terpolymer of methyl methacrylate, n-butyl methacrylate, and methacrylic acid.

EXAMPLES 12–16

Two-layer coatings with different barrier materials at varying dry coverages were coated from dilute solutions similar to Examples 1–11, but through an extruder hopper rather than from a two-roller hopper. These two-layer coatings, consisting only of an antistat layer and a barrier layer, were subjected to the recovery steps as described in Example 1. These results are also summarized in Table 1.

As is clearly evident from the table, the percent of barrier removed during recovery varies dramatically from one material to another. Little if any poly(methyl methacrylate) (Elvacite® 2041) is removed during recovery. Almost all poly(isobutylmethacrylate) (Elvacite® 2045) is removed, as is Elvacite® 2550. Copolymers of methyl and n-butyl methacrylate with small relative amounts of methacrylic acid are mostly removed (51–93% removed).

Polymers with glass transition temperatures between approximately 50 and 90° C. appear to have the highest percent removal during the recovery process. Polymers with too high a fraction of acid functionality, while mostly removed during recovery, do not function well as barrier materials as they allow water and hydroxide ion to reach the vanadium pentoxide during normal photoprocessing, destroying the antistatic protection.

TABLE 1

| Ex. No. | barrier polymer | no. of layers | Tg (° C.) | approx. wt % acid | barrier dry coverage (mg/ft2) | % removed |
|---|---|---|---|---|---|---|
| 1 | Elvacite 2041 | 3 | 119 | 0 | 36 | 0 |
| 2 | Elvacite 2045 | 3 | 55 | 0 | 25 | 87 |
| 3 | " | 3 | 55 | 0 | 40 | 96 |
| 4 | " | 3 | 55 | 0 | 55 | 93 |
| 5 | " | 3 | 55 | 0 | 58 | 93 |
| 6 | Elvacite 2550 | 3 | 50 | 2.6 | 15 | 92 |
| 7 | " | 3 | 50 | 2.6 | 28 | 100 |
| 8 | MMA-BMA-MA | 3 | 63 | 4.8 | 17 | 88 |
| 9 | " | 3 | 63 | 4.8 | 18 | 66 |
| 10 | " | 3 | 63 | 4.8 | 19 | 93 |
| 11 | " | 3 | 63 | 4.8 | 22 | 60 |
| 12 | " | 2 | 63 | 4.8 | 25 | 63 |
| 13 | " | 2 | 78 | 9.1 | 12 | 68 |
| 14 | " | 2 | 88 | 4.5 | 12 | 51 |
| 15 | Elvacite 2042 | 2 | 72 | 0 | 25 | 44 |
| 16 | Elvacite 2043 | 2 | 75 | 1.2 | 12 | 54 |

ADVANTAGES

Barrier materials such as Elvacite® 2045 and Elvacite® 2550 and copolymers of methyl and n-butyl methacrylate with small relative amounts of methacrylic acid provide excellent protection for the underlying antistat from chemical attack by processing solutions. At the same time, they have sufficient acid content and/or sufficiently low glass transition temperatures that they are completely or predominately removed during recovery along with the other coated layers/components. Therefore, their use in a photographic film support backing package provides the process-surviving antistatic protection desired, and allows any defective support to be recycled after passing through a recovery operation.

The invention has been described in detail with particular reference to certain preferred embodiments thereof, but it will be understood that variations and modifications can be effected within the spirit and scope of the invention.

What is claimed is:

1. A recyclable photographic film base comprising:

a cellulose acetate support;

an antistatic layer on one side of said support comprising an antistatic agent; and a barrier layer overlying said antistatic layer comprising a polymeric composition selected from the group consisting of poly(isobutyl) methacrylate; polybutyl methacrylate; a copolymer of ethyl methacrylate and methyl methacrylate; and a copolymer of methyl methacrylate, n-butyl methacrylate and methacrylic acid wherein the polymeric composition has a glass transition temperature of less than 90° C.

2. The film base of claim 1, further comprising:

an overcoat layer overlying said barrier layer comprising cellulose acetate and cellulose nitrate in a ratio of from 1:1 to 1.5:1.0 and from 5 to 40 weight percent fluorinated polymer particles having a particle size less than 0.4 microns.

3. The film base according to claim 1 wherein the antistatic agent comprises vanadium pentoxide; vinyl benzene quaternary ammonium polymers; an ester of cellulose having at least 8 acyl groups per $C_{24}$ cellulose unit wherein at least a majority of the acyl groups are derived from an aliphatic polycarboxylic acid having 3 to 6 carbon atoms, or a salt of the ester; or a copolymer of a vinyl benzene sulfonic acid and an ethylenically unsaturated monomer containing at least one primary hydroxyl group crosslinked with a methoxyalkylmelamine.

4. The film base according to claim 1 wherein the antistatic layer further comprises a polymeric binder.

5. The film base according to claim 4 wherein the polymeric binder comprises cellulose nitrate.

6. The film base according to claim 5 wherein the antistatic layer has a dry coverage of from 0.8 to 4 mg/sq ft.

7. The film base according to claim 1 wherein the barrier layer has a dry coverage of from 10 to 200 mg/sqft.

8. The film base according to claim 2 wherein the overcoat layer has a dry coverage of from 10 to 200 mg/sqft.

9. The film base according to claim 2 wherein the cellulose acetate of the overcoat layer has an acetyl content of about 32 percent.

10. The film base according to claim 2 wherein the polytetrafluoroethylene comprises particles having a size of about 0.26 microns.

11. The film base according to claim 1 further comprising at least one silver halide light sensitive emulsion on a second side of said support.

* * * * *